W. HOELDERLIN.
CONFECTIONERY DROPPING MACHINE.
APPLICATION FILED SEPT. 11, 1913.
1,117,573.
Patented Nov. 17, 1914.
3 SHEETS—SHEET 1.
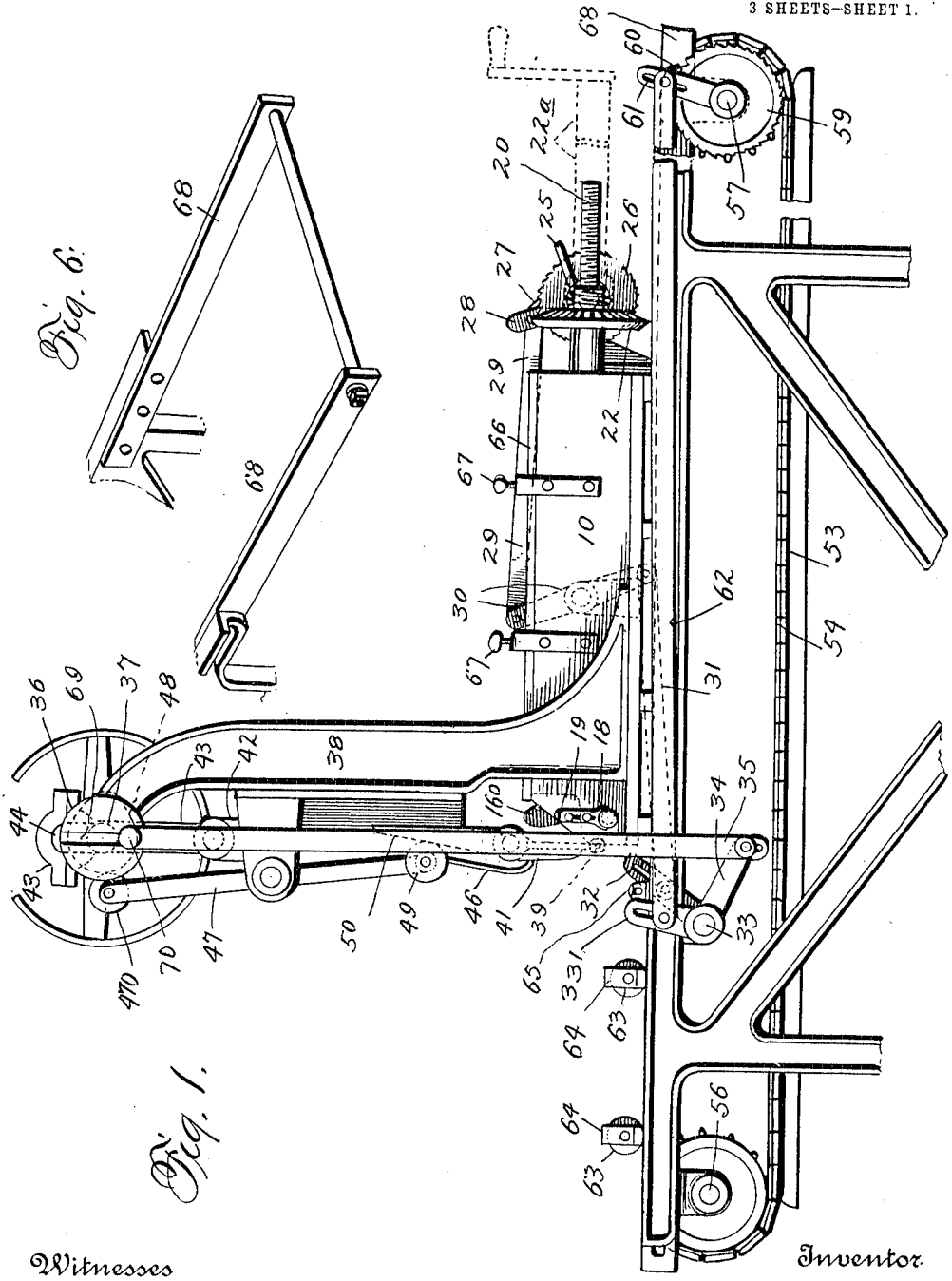
Witnesses
A. P. Hayes
C. J. Williamson
Inventor
William Hoelderlin,
By Chas. H. Fowler
Attorney W. HOELDERLIN.
CONFECTIONERY DROPPING MACHINE.
APPLICATION FILED SEPT. 11, 1913.
1,117,573.
Patented Nov. 17, 1914.
3 SHEETS—SHEET 2.
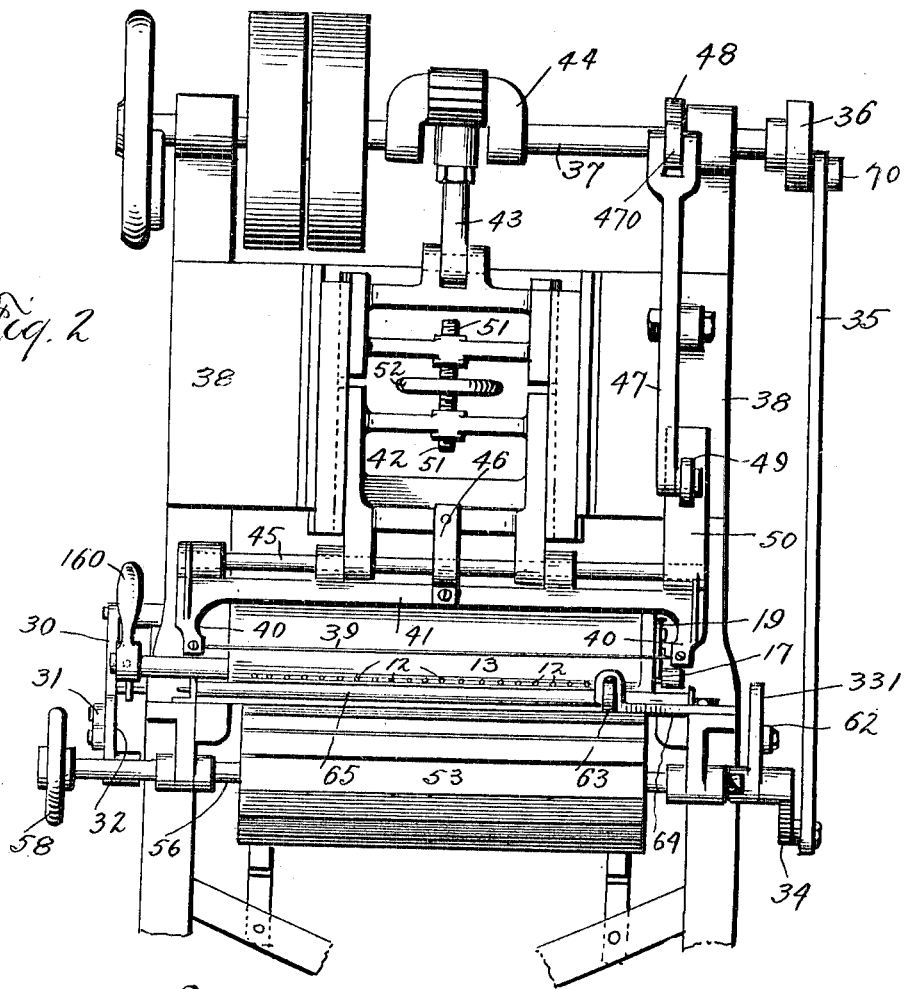
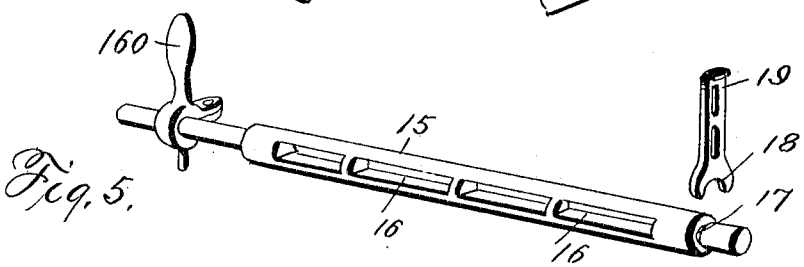

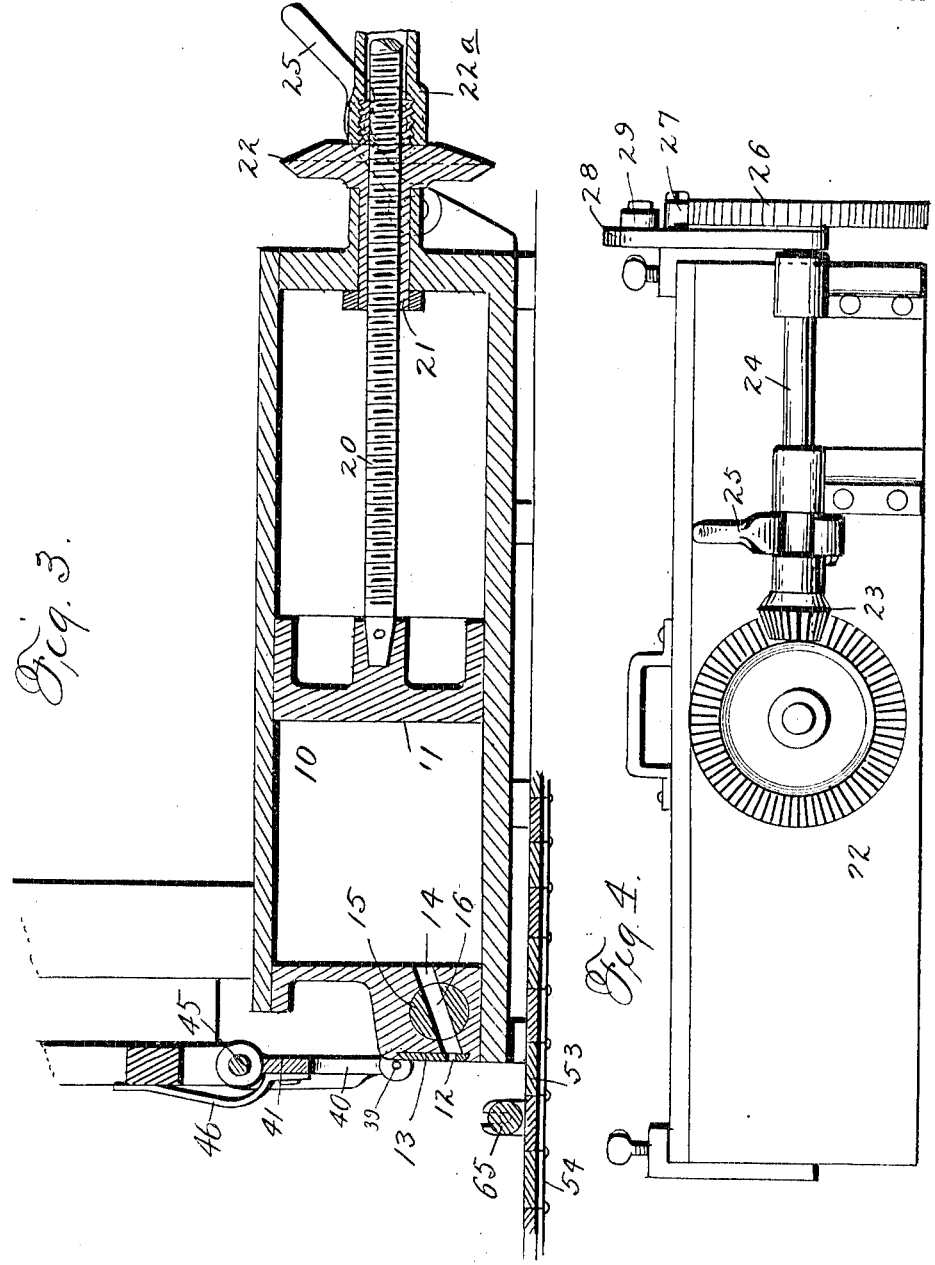

UNITED STATES PATENT OFFICE.

WILLIAM HOELDERLIN, OF BROOKLYN, NEW YORK.

CONFECTIONERY-DROPPING MACHINE.

1,117,573.  Specification of Letters Patent.  Patented Nov. 17, 1914.

Application filed September 11, 1913. Serial No. 789,268.

*To all whom it may concern:*

Be it known that I, WILLIAM HOELDERLIN, a citizen of the United States, residing in the borough of Brooklyn, in the county of Kings and State of New York, have invented certain new and useful Improvements in Confectionery-Dropping Machines, and do hereby declare that the following is a full, clear, and exact description of the same, reference being had to the annexed drawings, making a part of this specification, and to the letters and figures of reference marked thereon.

My invention relates to machines for dropping confectionery of the type shown in United States Patent No. 443,281, issued December 23, 1890, and my object is to improve machines of this type in order to secure better and more efficient operation thereof, and to render the construction thereof more acceptable, and to this end my invention consists in the construction substantially specified and claimed.

In the accompanying drawings—Figure 1 is a side elevation of a machine embodying my invention; Fig. 2 a front end elevation; Fig. 3 a detail view of a vertical, longitudinal section; Fig. 4 a detail view, in end elevation of the follower advancing gearing; Fig. 5 a detail view in perspective of the rotary valve; Fig. 6 is a detail view in perspective showing the frame extension.

The machines of the type to which my invention relates, generally described, comprise a reservoir or receptacle in which the confectionery paste is placed and from which it is forced or squeezed out through small holes in the form of drops, a cutting device severing or cutting off the exuding paste, and a traveling table which carries the paper on which the candy drops are placed. In the embodiment of my invention shown in the drawings, the reservoir 10, as is common, has the form of an oblong flat-sided box within which is a piston-like follower 11 which is advanced from one end of the box to the other to force the paste along through the box, and cause it to exude through small holes 12 arranged in a horizontal row in the end wall of the box, such holes being preferably formed in a removable plate 13 suitably secured on the end wall of the reservoir. Said holes 12 register with a passage 14 that extends at a slight incline downward and forward through the end wall of the reservoir. Intersecting said passage is a cylindrical valve 15 having a diametrically extending slot or port 16, which by the oscillation or partial turning of the valve may be placed in line with the passage and thus permit the outflow of paste, or turned out of line with said passage, thus obstructing or preventing the outflow of the paste. Thus, when the machine is not in use, but there is paste in the reservoir the paste can be prevented from flowing out of the reservoir. At one end just outside the reservoir the valve has a handle 160 by which it may be turned to a position to permit the outflow of paste or to a position to prevent the outflow, and suitable stops are provided to limit the turning of the valve to place it in its respective position. At its opposite end the valve projects beyond the side of the reservoir, and the projecting portion has an annular groove 17 which is engaged by the fork 18 of a vertical slidable latch-bar 19. By sliding the latch-bar until its fork clears the annular groove, the valve may be removed.

The piston-follower is pinned to one end of a horizontal screw 20 which passes through an internally threaded sleeve or nut 21, swiveled in the rear end wall of the reservoir, and said nut is attached to, or is the hub of a bevel gear wheel 22 which is in mesh with a pinion 23 on a horizontal shaft 24 by the rotation of which the nut is revolved, and the advancing or feeding movement of the piston-follower is produced. Said pinion is slidably connected with its shaft so that it may be moved axially or slid into and out of the mesh with the gear. When the pinion is in mesh with the gear wheel it is held there by an arm 25 which bears against the outer end of the pinion hub. Said arm 25 is pivoted to the end wall of the reservoir, so that it may be swung to one side of the pinion and its hub to allow the pinion to be shifted out of mesh with the gear, and swung back to its pinion-holding position. When the pinion is out of mesh the gear 22 may be revolved by a crank handle 22ª to reverse the travel of the pinion follower after the forward feeding movement of the latter has been completed and it is desired to place a fresh quantity of paste in the reservoir. The crank handle 22ª has a hollow shank which passes over the feed screw 20, and the said shank at its end is internally threaded to engage thread on the hub of the gear wheel 22 so that the crank handle and gear wheel may thereby be connected together, and the rotation of the crank imparted to the gear wheel, the threaded connection between the shank and the gear wheel being such as to couple the two together when the crank handle is revolved in the direction required to rotate the gear wheel to produce the rearward travel of the piston-follower.

On the shaft 24 at one side of the reservoir is a ratchet wheel 26 adapted to be engaged by a pawl 27 on an arm 28 pivoted to the shaft. Said arm 28 is connected by a link 29 with a rocking lever 30, which lever in turn is connected by a link 31 with a crank arm 32 on a horizontal rock shaft 33 extending to the opposite side of the machine, at which side the said rock shaft has a crank arm 34, which is connected by a pitman 35 with a crank disk 36, on one end of an overhead, horizontal main shaft 37 which is supported in bearings upon a vertical frame 38 rising from the top of the side bars of the machine legs. Said main driving shaft has fast and loose pulleys for the driving belt which runs to a suitable counter-shaft.

The drops of paste exude from the front wall holes of the reservoir, and are severed or cut off by a severing device in the form of a horizontal wire 39 which is stretched between, and secured at its end to downward projecting arms 40 on a horizontal bar 41, which is pivoted or hinged to the lower end of a vertically reciprocable head or plunger 42 that slides on guides on the front of the frame 38, said head or plunger being connected at its top by a pitman 43 to a crank 44 on the main driving shaft 37. The pivotal connection between the wire carrying bar and the head is formed by means of a rod 45 which passes through alining eyes on the lower part of the head and the upper side of the wire-carrying bar. A flat spring 46 fastened at one end to the wire-carrying bar and extending upward therefrom, bears at its upper end against the front side of the head, swings the wire-carrying bar in a direction to press the wire against the outer face of the front end wall of the reservoir, so that on the downward movement of the wire for a cutting-off operation, the wire will be pressed close against the said outer face, and sever the drops in a plane coincident with the outer face of the hole-carrying plate. In the ascending movement of the wire after having cut off the drops, inasmuch as the paste is being pressed out through the holes, the wire carrying bar is swung so as to carry the wire forward in advance of the exuding paste, and to keep it in advance thereof during the upward movement of the wire until it reaches a point above the line of paste exuding holes, when the wire is again brought against the outer face of the end wall, ready for another cutting operation, and such movement causing the wire to travel through the path described in automatically produced by means of a lever 47, pivoted between its ends to the frame 38, which at its upper end has a roller 470 in the path of a cam 48 on the main shaft 37, and at its lower end has a roller 49 which bears against an upwardly extending arm 50 on the wire-carrying bar. Thus the wire-carrying bar is moved by the cam-actuated lever against the action of the spring 46 causing the wire to travel through the path described. For the purpose of close adjustment of the wire vertically, the vertically reciprocable head or plunger is composed of two horizontally divided parts which are connected by right and left screws 51 which have a wheel 52 for turning them.

Below the reservoir I employ an endless belt or apron 53 composed of horizontal slats secured to sprocket chains 54 which at the opposite ends of the machine pass over sprocket wheels, which at the front end of the machine are carried by a horizontal shaft 56, and at the rear end of the machine are carried by a horizontal shaft 57. The horizontal shaft 56 has at one end a hand wheel 58 by which the apron may be moved by hand, and the horizontal shaft 57 has on one end a ratchet wheel 59, engaged by a pawl 60, on an arm 61 pivoted to the shaft and which is connected by a pitman 62 to a crank arm 331 on the shaft 33 from which movement is derived to advance the piston follower in the paste reservoir. The paper is laid upon the upper run of the apron, and it passes near one side, beneath several rollers 63 supported by bracket arms 64 extending from the machine frame, and just before the paper reaches the point where the drops of paste are deposited upon it, it passes beneath a roller 65 that extends entirely across the apron and makes certain that the paper will not be lifted from the apron and will be in a position to receive the drops of paste. Preferably the apron slats are formed of iron or other metal.

The top 66 of the reservoir is held in place by clamping screws 67 at the edges thereof so that it may be easily and quickly removed and reapplied.

The side bars of the frame are prolonged by extension bars 68 reaching rearward so as to form a rest or support for a removable shelf to form a convenient table for use in connection with the machine.

The plate 13 having the discharge holes, or orifices, is made removable in order to enable the use at different times of discharge holes of different sizes and shapes, a number of plates being provided with holes of assorted sizes so that one plate with holes of one size may be substituted for a plate with holes of a different size. Inasmuch as the use of holes of different sizes vertically calls for variation in the stroke or travel of the head or plunger 42, which carries the cutting off wire 39, and also of variation of the travel of the receiving apron I make the stroke of the head or travel of the apron variable. This is conveniently done by providing the face of the crank disk 37 with the diametrically extending slot 69 that permits the crank pin 70 to be shifted to different distances from the center of rotation of the crank disk. As the crank disk 37 reciprocates the cutter-carrying-head, or plunger, and also causes the feed, or travel of the drop receiving apron, or belt, the one adjustment serves to change the stroke of the head and the travel of the apron. As best shown in Fig. 3 the plate 13 has a dove tail form in cross section which fits a correspondingly shaped groove in the front end wall of the reservoir 10, so that the removal of a plate 13 and the substitution of another is effected by sliding the plate endwise to draw it from or place it in position in the groove.

Having thus described my invention what I claim is—

In a confectioner's dropping machine, the combination of a paste reservoir having one of its vertical walls perforated for the discharge of paste, a reciprocating head or plunger, vertical guides for the latter above the reservoir, a cutter carrying bar pivoted to said head or plunger and hanging from the pivotal connection adjacent the perforated reservoir wall, and partaking of the movement of the plunger, said bar having an upstanding arm, a lever pivoted to a stationary support and engaging said arm at its lower end, a shaft, connections between said shaft and the head or plunger to reciprocate the latter, and a cam on said shaft acting on said lever at its upper end.

In testimony whereof I affix my signature in presence of two witnesses.

WILLIAM HOELDERLIN.

Witnesses:
LAURA H. RAHM,
MARGARET E. KOLLER.

Copies of this patent may be obtained for five cents each, by addressing the "Commissioner of Patents, Washington, D. C."